Figure 1:
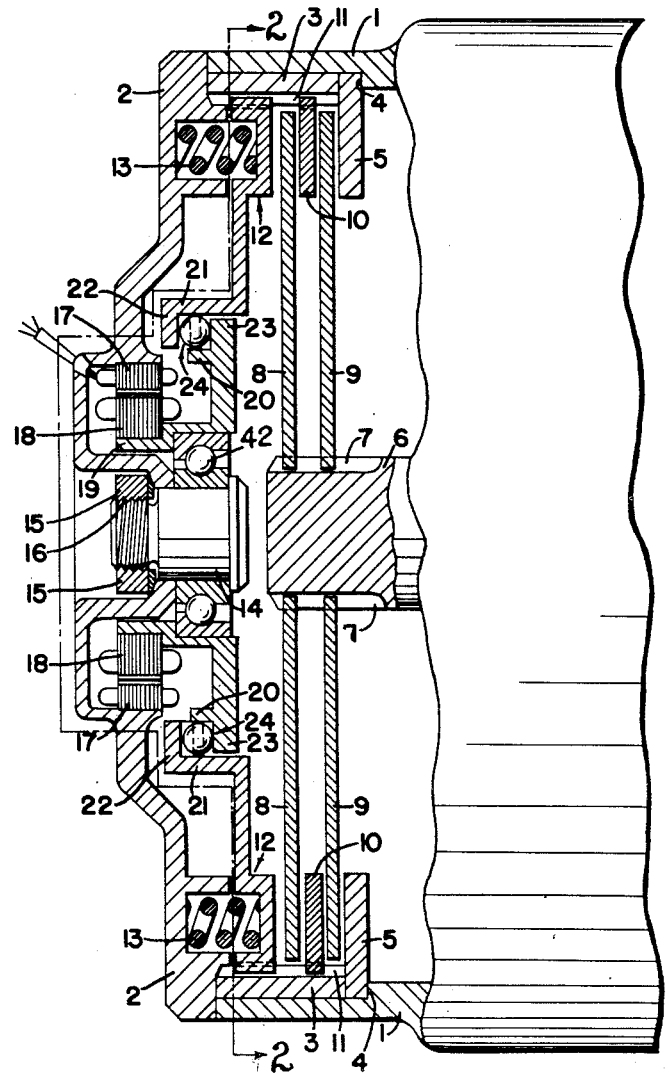

Nov. 2, 1954      T. BARISH      2,693,254
ROTARY SHAFT BRAKING MECHANISM
Filed Sept. 22, 1953      2 Sheets-Sheet 1

*INVENTOR.*
THOMAS BARISH
BY
ATTY.

Nov. 2, 1954  T. BARISH  2,693,254
ROTARY SHAFT BRAKING MECHANISM
Filed Sept. 22, 1953  2 Sheets-Sheet 2
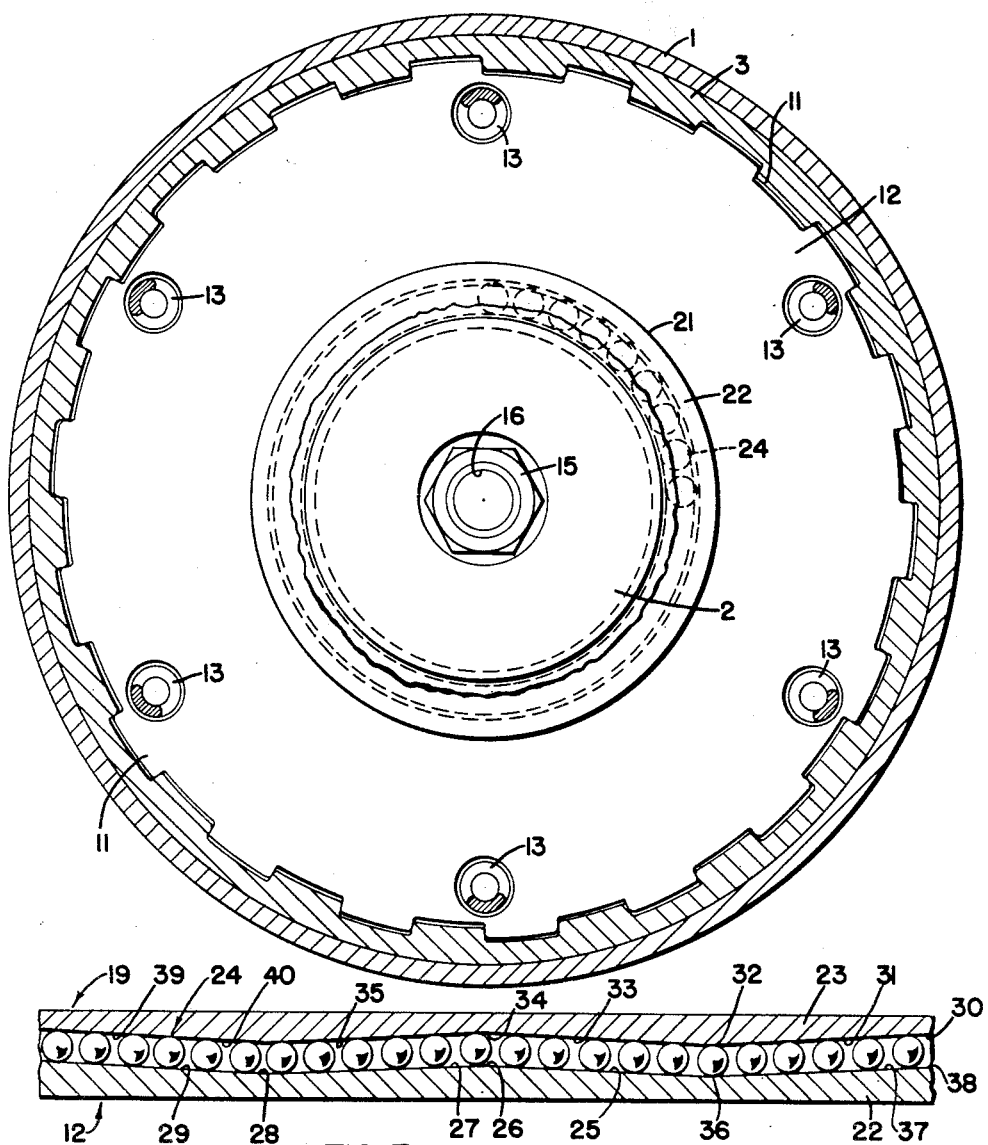
*INVENTOR.*
THOMAS BARISH
BY 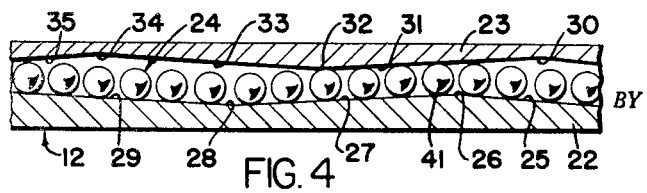
ATTY.

United States Patent Office 2,693,254
Patented Nov. 2, 1954

2,693,254

ROTARY SHAFT BRAKING MECHANISM

Thomas Barish, Shaker Heights, Ohio, assignor to Jack & Heintz, Inc., Cleveland, Ohio, a corporation of Delaware Application September 22, 1953, Serial No. 381,567

7 Claims. (Cl. 188—171)

This invention relates in general to braking mechanism and more particularly to improvements in braking mechanism for electric motor driven rotating shafts, wherein the brake is normally resiliently engaged and wherein there is employed an electric solenoid that is energized at the same time the shaft driving electric motor is operated, for magnetically disengaging the brake in opposition to the force of the resilient means for engaging the brake.

I am aware that there are in existence certain relatively small electric motor driven shaft friction disc braking assemblies, that usually employ a solenoid acting directly on the outboard brake disc to release the brake upon application of electric current and to hold the brake disengaged as long as the shaft driving motor is in operation. The moment the current is off, the brake is immediately resiliently re-engaged. Such an arrangement has its mechanical limitations because of the limitations of travel of the solenoid.

On relatively larger brake motors, the necessary solenoid travel requirement is increased. This is because there are required a larger number of larger brake discs with greater clearance between them. Greater wear occurs, necessitating provision of mechanical wear compensating adjustment devices. Especially in aircraft equipment, such an arrangement is not acceptable because it is not foolproof and may cause serious trouble, either because it is not mechanically adjusted soon enough or well enough.

It is therefore one of the primary objects of my invention to provide an improved motor brake release mechanism in which the torque motor is not limited as to travel and in which the mechanical means operated thereby is such that enables the obtaining of a high mechanical ratio, with simple parts and with maximum mechanical efficiency.

It is also an object to provide such a mechanism that needs no mechanical adjustments to compensate for brake disc wear.

A further object is to provide such an assembly that is capable of efficient operation even upon reversal of direction of rotation of the shaft.

Generally speaking, I propose to replace the usual solenoid with a torque motor of relatively small size and provided with a stator and a rotor. To the shaft I longitudinally slidably spline a given number of friction brake discs and I likewise spline one or more brake discs to the housing. I also longitudinally slidably spline a spring cage that is normally urged by compression coil springs in a direction to compress the friction brake disc assembly to brake the shaft against rotation.

The important point is to immediately release the brake upon energization of the shaft driving motor and to immediately re-engage the brake upon de-energization of the shaft driving motor. Accordingly, I propose to employ a two-part ball bearing, one part to be a spring cage and the other part to be rigid with the rotor and supported by bearings to be rotatable in the housing independently of the shaft. The opposed faces of the spring race and the rotor race are each provided with two parallel axial ramps of a circumferential length of 180 degrees each, between which are disposed a series of rolling elements, such as balls or rollers. In this manner, when the torque motor is energized, upon energization of the shaft driving motor, the rotor ramp, in rotating, becomes relatively displaced with respect to the opposed non-rotary spring ramp. The rotor ramp rotates but cannot move axially. The spring ramp may move axially but cannot rotate. Thus, a rotation of the rotor ramp is translated into axial movement of the spring ramp, against the opposing action of the spring, to release the brake. De-energization of the torque motor allows the expansive force of the spring to force the balls down to the low spots of the ramps to reverse the movement of the rotor ramp so as to again compress the brake discs together and re-engage the brake. High efficiency is required in order to permit this reversal of operation and this is accomplished by the use of balls.

With the foregoing and other objects in view, the invention resides in the combination of parts and in the details of construction hereinafter set forth in the following specification and appended claims, certain embodiments thereof being illustrated in the accompanying drawings, in which:

Figure 1 is a fragmentary view of a housing, partly in side elevation and partly in longitudinal section, to show an electric motor driven rotary shaft, a shaft braking assembly including friction brake discs alternately longitudinally splined to the shaft and to the stationary housing, a cage normally spring urged to compress the discs to engage the brake, a torque motor, responsive to energization and de-energization of the shaft driving motor, and including a stator and rotor, a rotatably mounted ball ring, or race, carried by the rotor, a ball cage rigid with the spring ring, the opposed faces having axial ramps between which are disposed a series of balls, and showing the brake off;

Figure 2 is a view partly in front elevation and partly in section taken along line 2—2 of Figure 1;

Figure 3 is schematic view, showing the opposed ramps and interposed balls developed from circular to longitudinal form, showing the parallel ramps aligned with the balls engaging the low spots to represent their respective positions when the brake is on; and Figure 4 is a similar view showing the rotor ramp relatively displaced circumferentially and axially, with respect to the stator ramp, when the brake is off.

Referring more particularly to the drawings, the main housing 1 has releasably secured thereto an end plate 2. Rigid with the inner surface of housing 1 is a stationary sleeve 3 and rigid with, and maintained between the inner end of sleeve 3 and a housing shoulder 4, is a centrally apertured stationary ring 5.

Suitably supported for rotation within the housing is a shaft 6 that is driven by a suitable electrical motor in the conventional manner. Near its outer end, shaft 6 is provided with longitudinal external splines 7 to slidably receive internally splined and axially spaced friction brake discs 8 and 9. Interposed between brake discs 8 and 9 is a friction brake disc 10 that is externally splined to longitudinally slidably engage internal longitudinal splines 11 on the inner surface of stationary sleeve 3. Also longitudinally slidably engaging splines 11 of sleeve 3 is an externally splined ring 12. Interposed between ring 12 and the end plate 2 are compression coil springs 13. Although the cage 12 is shown in Figure 1 to be removed from brake disc 8 and the brake assembly disengaged by means yet to be described in detail, spring 13 normally compresses the brake discs together to engage the brake on the shaft. Coaxially disposed with respect to shaft 6 is a stationary stub shaft 14 supported by end plate 2 and releasably secured thereto by nuts 15 engaging screw threads 16 on shaft 14.

As stated before, my invention is particularly adapted for use in connection with electric motor driven rotary shafts, and in which the shaft braking mechanism is such as to be normally spring urged into engagement. The particular problem presented is to provide an effective and efficient brake releasing means that will be operable by a relatively small electric motor instantaneously upon energization of the shaft driving motor and also instantaneously ineffective to permit the spring to quickly re-engage the brake. In meeting and solving this problem, I preferably employ a torque motor, or rotary solenoid, whether supplied with A. C. or D. C. current, and by which the shaft driving motor is energized. Such a torque motor may include a stator 17 supported by end plate 2 and a rotor 18 carried by a cage 19 that is supported by bearings 42 for rotation about the stationary stub shaft 14. Cage 19 has an axial circular flange 20 to support a series of circumferentially arranged balls 24 between it and an axial flange 21 of cage 12. The balls are further enclosed axially by the opposed inner faces of radial flange 22 of cage 12 and radial flange 23 of cage 19. Such a series of balls I designate generally at 24.

The inner opposed faces of radial flanges 22 and 23 of the spring cage 12 and rotor cage 19 are each provided with complementary axially inclined and parallel 180 degree circumferential ramps. Figure 3 represents the cage, ramp and ball assembly when the main motor and the torque motor are deenergized. The torque motor rotor is stationary and the spring 13 is effective to compress the brake disc assembly to brake the shaft. Here, the inclined rotor cage ramps 31, 33, 35 and 39 are in parallel alignment with spring cage ramps 37, 25, 27 and 29, respectively. Moreover, rotor cage ramp low spots 30 and 34 are in alignment with spring cage high spots 38 and 26 and rotor cage ramp high spots 32 and 40 are in alignment with spring cage low spots 36 and 28. In such a position, the load of the expansive force of spring 13 is borne equally by all of the balls.

When the torque motor is energized, the rotor cage is rotated while the spring cage remains stationary. By reference to Figure 4, I have illustrated the resulting shifting of positions of the assembly when the rotor cage has been rotated in one direction. Here, the rotor cage low spots 30 and 34 have shifted to the left to be practically midway of the spring cage ramps 25 and 29 and the rotor cage high spot 32 has shifted to the left to be practically midway of the spring cage ramp 27. This brings ball 41 under the maximum lead, as well as similarly disposed balls, after the shift of the rotor ring, while the balls on each side thereof are progressively relieved to a point of no compression and actual clearance. The result of this shift is to translate the rotary movement of the rotor ring into positively applied linear force and axial movement of the spring cage 12 away from brake disc 8. This leaves the brake disc assembly uncompressed and the brake disengaged.

It follows that upon de-energization of the torque motor, spring 13 again takes over and, by reason of the balls in the opposed parallel ramps, acts to reverse the rotation of the rotor ring until it resumes its normal position of Figure 3 to re-engage the brake.

I claim:

1. In a brake assembly for an electrical motor driven rotary shaft, a stationary housing in which said shaft is mounted, friction brake discs alternately arranged to be longitudinally slidably splined respectively to said shaft and said housing, a slidable non-rotative ring longitudinally splined to said housing and resilient means to normally force said ring to compress said friction discs together to engage said discs in braking relationship with said shaft against rotation, a torque motor having a stator and a rotor, a rotor ring for carrying said rotor and mounted for rotation in said housing independently of said shaft, axially opposed faces on said rings, at least one of which faces is provided with an axially inclined circumferentially extending ramp, a series of rolling elements disposed between said opposed faces, said rotor, upon energization of said torque motor, being adapted to rotate with its ring to shift the normal relationship between the opposed faces and, through the rolling elements therebetween, force said slidable non-rotative ring against the action of said resilient means, axially away from said brake discs to disengage said brake.

2. In a brake assembly for an electrical motor driven rotary shaft, a stationary housing in which said shaft is mounted, friction brake discs alternately arranged to be longitudinally slidably splined respectively to said shaft and said housing, a slidable non-rotative ring longitudinally splined to said housing and resilient means to normally force said ring to compress said friction discs together to engage said discs in braking relationship with said shaft against rotation, a torque motor having a stator and a rotor, a rotor ring for carrying said rotor and mounted for rotation in said housing independently of said shaft, axially opposed faces on said flanges, both of which faces are provided with an axially inclined circumferentially extending ramp, a series of rolling elements disposed between said opposed ramps, said rotor, upon energization of said torque motor, being adapted to rotate with its ring to shift the normal relationship between the opposed ramps and, through the rolling elements therebetween, force said slidable non-rotative ring, against the action of said resilient means, axially away from said brake discs to disengage said brake.

3. In a brake assembly for an electrical motor driven rotary shaft, a stationary housing in which said shaft is mounted, friction brake discs alternately arranged to be longitudinally slidably splined respectively to said shaft and said housing, a slidable non-rotative ring longitudinally splined to said housing and resilient means to normally force said ring to compress said friction discs together to engage said discs in braking relationship with said shaft against rotation, a torque motor having a stator and a rotor, a rotor ring for carrying said rotor and mounted for rotation in said housing independently of said shaft, axially opposed faces on said rings, each of which faces is provided with two normally parallel axially inclined circumferentially extending ramps, a series of rolling elements disposed between said opposed ramps, said rotor, upon energization of said torque motor, being adapted to rotate with its ring to shift the normal relationship between the opposed ramps and, through the rolling elements therebetween, force said slidable non-rotative ring, against the action of said resilient means, axially away from said brake discs to disengage said brake.

4. In a brake assembly for an electrical motor driven rotary shaft, a stationary housing in which said shaft is mounted, friction brake discs alternately arranged to be longitudinally slidably splined respectively to said shaft and said housing, a slidable non-rotative ring longitudinally splined to said housing and resilient means to normally force said ring to compress said friction discs together to engage said discs in braking relationship with said shaft against rotation, a torque motor having a stator and a rotor, a rotor ring for carrying said rotor and mounted for rotation in said housing independently of said shaft, axially opposed faces on said rings each of which faces is provided with two normally parallel axially inclined circumferentially extending ramps of 180 degrees, a series of balls disposed between said opposed ramps, said rotor, upon energization of said torque motor, being adapted to rotate with its ring to shift the normal relationship between the opposed ramps and, through the balls therebetween, force said slidable non-rotative ring, against the action of said resilient means, axially away from said brake discs to disengage said brake.

5. In a brake assembly for an electrical motor driven rotary shaft, a stationary housing in which said shaft is mounted, friction brake discs alternately arranged to be longitudinally slidably splined respectively to said shaft and said housing, a compression coil spring and a ring therefor longitudinally slidably splined to said housing to normally compress said friction discs together to engage said discs in braking relationship with said shaft against rotation, a torque motor having a stator and a rotor, a rotor ring for carrying said rotor mounted for rotation in said housing independently of said shaft, flanges on said coil spring ring and rotor ring, axially opposed faces on said flanges, at least one of which is provided with an axially inclined circumferentially extending ramp, a series of balls disposed between said opposed faces, said rotor, upon energization of said torque motor, being adapted to rotate with its ring to shift the normal relationship between the opposed faces and, through the balls therebetween, force said coil spring ring, against the action of said coil spring, axially away from said brake discs to disengage said brake.

6. In a brake assembly for an electrical motor driven rotary shaft, a stationary housing in which said shaft is mounted, friction brake discs alternately arranged to be longitudinally slidably splined respectively to said shaft and said housing, a compression coil spring and a ring therefor longitudinally slidably splined to said housing to normally compress said friction discs together to engage said discs in braking relationship with said shaft against rotation, a torque motor having a stator and a rotor, a rotor ring for carrying said rotor and mounted for rotation in said housing independently of said shaft, flanges on said coil spring ring and rotor ring, axially opposed faces on said flanges, each of which faces is provided with an axially inclined circumferentially extending ramp, a series of balls disposed between said opposed ramps, said rotor, upon energization of said torque motor, being adapted to rotate with its ring to shift the normal relationship between the opposed ramps and, through the balls therebetween, force said coil spring ring, against the action of said coil spring, axially away from said brake discs to disengage said brake.

7. In a brake assembly for an electrical motor driven rotary shaft, a stationary housing in which said shaft is mounted, friction brake discs alternately arranged to be longitudinally slidably splined respectively to said shaft and said housing, a compression coil spring and a ring therefor longitudinally slidably splined to said housing to normally compress said friction discs together to engage said discs in braking relationship with said shaft against rotation, a torque motor having a stator and a rotor, a rotor ring for carrying said rotor and mounted for rotation in said housing independently of said shaft, flanges on said coil spring ring and rotor ring, axially opposed faces on said flanges, each of which faces is provided with two normally parallel axially inclined circumferentially extending ramps, a series of balls disposed between said opposed ramps, said rotor, upon energization of said torque motor, being adapted to rotate with its ring to shift the normal relationship between the opposed ramps and, through the balls therebetween, force said spring ring, against the action of said coil spring, axially away from said brake discs to disengage said brake.

References Cited in the file of this patent

UNITED STATES PATENTS

| Number | Name | Date |
|---|---|---|
| 1,254,372 | Stanley | Jan. 22, 1918 |

FOREIGN PATENTS

| Number | Country | Date |
|---|---|---|
| 631,944 | France | Sept. 24, 1927 |